(12) United States Patent
Diemer et al.

(10) Patent No.: US 6,391,199 B1
(45) Date of Patent: May 21, 2002

(54) FILTRATION MEMBER FOR A HORIZONTAL DISC FILTER

(75) Inventors: Wolfgang Diemer; Markus Kolczyk, both of Waldstetten (DE)

(73) Assignee: Seitz-Schenk Filtersystems GmbH, Bad Kreuznach (DE)

(*) Notice: Subject to any disclaimer, the term of this patent is extended or adjusted under 35 U.S.C. 154(b) by 0 days.

(21) Appl. No.: 09/601,836

(22) PCT Filed: Jan. 19, 1999

(86) PCT No.: PCT/EP99/00304

§ 371 Date: Sep. 29, 2000

§ 102(e) Date: Sep. 29, 2000

(87) PCT Pub. No.: WO99/39803

PCT Pub. Date: Aug. 12, 1999

(30) Foreign Application Priority Data

Feb. 5, 1998 (DE) ............................... 198 04 494

(51) Int. Cl.[7] .............................................. B01D 33/15
(52) U.S. Cl. .................. 210/330; 210/344; 210/345; 210/455
(58) Field of Search ................. 210/323.1, 333.01, 210/346, 486, 330, 331, 455, 344, 345

(56) References Cited

U.S. PATENT DOCUMENTS

| | | | |
|---|---|---|---|
| 3,931,017 A | 1/1976 | Schulte et al. | 210/330 |
| 3,948,778 A | 4/1976 | Müller | 210/330 |
| 4,282,094 A | 8/1981 | Betz | 210/331 |
| 4,708,797 A | 11/1987 | Steinbecker | 210/330 |
| 5,549,824 A | * 8/1996 | Trumpf et al. | 210/323.1 |

FOREIGN PATENT DOCUMENTS

| | | |
|---|---|---|
| CH | 458 286 | 8/1968 |
| DE | 28 46 216 | 5/1980 |
| DE | 34 05 483 A1 | 8/1985 |
| EP | 0 425 725 A1 | 5/1991 |
| EP | 0 671 198 A1 | 9/1995 |

* cited by examiner

*Primary Examiner*—Robert J. Popovics
(74) *Attorney, Agent, or Firm*—Gudrun E. Huckett

(57) ABSTRACT

A filter member for horizontal disc filters has a base plate having a peripheral edge and a hub connected to the base plate. The base plate has cavities extending in a radial direction of the base plate at a slant toward the hub, wherein the cavities are positioned closely adjacent to one another. The base plate has narrow projections formed between the cavities. A filter medium, providing a support for deposition filtration and cake-forming filtration, is formed as a thin filter plate with very small openings. The hub, the projections between the cavities, and the peripheral edge have support surfaces for supporting the filter plate. The filter plate is at least partially connected to these support surfaces by material bonding such as welding.

22 Claims, 5 Drawing Sheets

FILTRATION MEMBER FOR A HORIZONTAL DISC FILTER

BACKGROUND OF THE INVENTION

1. Field of the Invention

The invention relates to a filter member for horizontal disc filters with a hub and a base plate connected therewith, on which a filter medium is fastened which forms a support for the deposition filtration and the filtration forming a cake which support extends close to a peripheral edge of the base plate, and with cavities arranged in the base plate and extending in the radial direction at a slant toward the hub.

2. Description of the Related Art

Horizontal disc filters comprise conventionally a plurality of disc-shaped filter members stacked atop one another whose filter surfaces are arranged horizontally. In this connection, the supply can be performed from the interior, i.e., through a central inlet channel, or from the exterior, i.e., from the inner space of the filter container.

From DE 34 05 483 A1 a disc filter member for a horizontal disc filter is known which is suitable for forming a stack of filter members on a central tube. This filter member comprises a hub as well as a base plate that is connected thereto and is of a circular annular shape when viewed in a plan view. The circular annular base plate is connected with its inner radius to the outer periphery of the hub, and a ring-shaped, downwardly formed cavity is provided close to the outer peripheral edge. A support fabric, that rests with its inner edge on a projection of the hub and is supported over a large surface area on the circular ring of the base plate, extends with its outer area past the ring-shaped cavity. A filter fabric is arranged above the support fabric and spans the hub, the support fabric, and the outer peripheral edge of the base plate, and is secured by a clamping ring seal tight at the peripheral edge of the base plate. At the underside of the base plate radially extending cavities are provided which are distributed with a large angular spacing about the circular periphery and which connect the ring-shaped cavity at the outer periphery of the base plate with a collecting channel surrounding the hub. These radial cavities serve to guide away the filtrate, which collects in the ring-shaped cavity, toward the collecting chamber and from there into the central shaft.

The large mesh support and drainage fabric ensures that the fine mesh filter fabric has a certain spacing to the base plate so that passage of liquid is altogether ensured thereby. Moreover, the filtrate is guided radially inwardly, i.e., toward the hub, via the openings formed within the support and drainage fabric. Since the filter fabric during the filter operation loses its tension at least partially, from time to time a detachment of the clamping ring and a re-clamping of the filter fabric as well as a new fixation by means of the clamping ring are required. Should wear of the filter fabric occur, it must be replaced completely. The filter members of the known horizontal disc filter are therefore complex components with respect to their construction and manufacture as a result of their operating principle.

SUMMARY OF THE INVENTION

It is an object of the invention to provide a filter member for horizontal disc filters of the aforementioned kind which is simpler in its configuration and significantly more wear resistant.

In accordance with the present invention, the object is solved in that in the base plate a plurality of cavities are provided which extend radially and are positioned closely adjacent to one another, with narrow projections formed therebetween, and that the filter medium is a thin filter plate with very small openings, that is supported on the hub as well as on the projections between the cavities and on a surface on the peripheral edge of the base plate and is at least partially connected thereto by a connection by material bonding in the area of the support surfaces.

The important advantages of the invention are to be seen in that the filter medium, that is, the thin filter plate and the base plate, are comprised of a material combination which allows a connection by material bonding on the inner as well as the outer peripheral edge and a plurality of connecting points of the filter plate with the base plate. The number of individual parts per filter member is reduced as well as the mounting expenditure, while at the same time the manufacturing quality is increased. Also, the removal of the filtrate through the cavities is more favorable because they form clearly defined channels in contrast to a drainage fabric which has a greater through flow resistance. By eliminating the drainage fabric, a source of soiling is eliminated because filter residues can collect in the drainage fabric, primarily in the area close to the outer edge. The filtration aids which have penetrated the filter medium as well as product particles can be transported away without resistance in the filtrate direction in the smooth cavities at an incline. The members can be permanently kept clean so that a stable end constant operational state is ensured. A drift in the filtrate quality resulting from soiling is thus prevented.

For the purpose of cleaning the horizontal disc filter, the filter members are rotated wherein the cavities of the base plate of the member package act as turbulators. The greater turbulence generated by the cavities in the base plate and the thus increased shearing forces enhance the cleaning effect.

According to a preferred embodiment of the invention the filter plate is welded to the support surfaces of the base plate. By welding the filter plate to the base plate along the projections as well as at the inner and outer edge of the base plate, a dimensionally stable sandwich construction results which, because of the plurality of connecting locations and the minimal spacing between the connecting points, ensures an extremely high stability of the construction and is also able to withstand increased forces in a backflow load situation. An inflation of the filter members by increased inner pressure is thus prevented. Expediently, the filter plate as well as the base plate are comprised of stainless steel or a stainless steel alloy so that for most applications the most favorable conditions are provided with respect to mechanical strength as well as chemical resistance. As an alternative to this, the base plate and the filter plate can also be comprised of plastic, preferably PVC, PE, PP, or PVDF.

In the case where the base plate is comprised of a sheet metal, it is preferably a stamped or deepdrawn part in which the cavities are embodied as beads. These beads in the base plate provide an increased dimensional stability so that the base plate, with respect to conventional arrangements, has a reduced thickness while maintaining the same dimensional stability. In this context, the thickness is preferably <6 mm; a thickness of approximately 1.5 mm is considered especially suitable. Due to the minimal thickness the material expenses decrease, and the weight of the filter members is also significantly reduced. Because of the weight savings in this construction the manipulation of the filter members during assembly and demounting of the horizontal disc filter is facilitated. Moreover, when rotating the filter member packages for the purpose of cleaning, a reduced inert mass is to be accelerated so that the energy consumption is lowered and the required driving power is also reduced. The weight reduction thus results in the use of smaller drive devices and a reduced loading of the foundation so that cost savings can also be achieved in this respect.

For the purpose of closing off as few as possible of the openings in the filter plate by resting it on the projections, it is advantageous to design the upper edge of the projections, with respect to its cross-sectional shape, as arc-shaped domes so that a linear contact of the filter plate is provided. In this context it is expedient that the projections are substantially of a constant width and the width of the cavities between these projections varies. The spacing between two projections is maximally approximately 50 mm, preferably, however, less than 15 mm, so that a bending of the relatively thin filter plate into the cavities can be prevented. The cross-section of the beads can be designed differently depending on the geometric conditions of the filter members wherein in this context especially a V-shaped or a U-shaped cross-section is to be considered.

In order to make a complete emptying of the filter members possible, the cavities are designed in their longitudinal direction such that an incline toward the hub is provided which is at least 0.5°, relative to a horizontal axis, preferably however approximately 2°. With this measure, no residues remain in the interstitial spaces which is especially important in connection with cleaning by chemicals or when changing the product. The beads with a slant toward the interior allow a safe venting of the sludge space below the base plate. Moreover, with this shape an outwardly open wedge shape of the sludge space below the filter member results so that, even when overshooting the filter, the filter cake cannot wedge itself and can be removed without difficulties.

Since the projections extend in a star shape toward the hub, it is expedient in regard to embodiments in which the projections have a constant width, that first and second projections of different lengths are provided, wherein the first and second projections are arranged alternatingly and distributed about the periphery of the base plate. The projections start respectively at the outer edge of the base plate and thus extend over different lengths in the direction toward the hub. In this connection it is preferred that the length of the first projections is approximately ¾ to ⅘ of the outer radius of the annular ring and the length of the second projections is approximately ¾ of the length of the first projections. Depending on the size of the outer radius of the base plate, it is also possible to provide third projections which are significantly shorter than the second projections and which extend respectively between the first and second projection at a spacing thereto. The length of the third projections in this connection can be approximately ⅙ of the length of the first projections.

In order to maintain the spacing of the outer edges of the filter members in the axial direction in a reliable fashion, it is advantageous that several axially extending spacer elements, extending in the axial direction of the member package, are welded onto the peripheral edge of the base plate in a uniform distribution about the circular periphery.

BRIEF DESCRIPTION OF THE DRAWING

Embodiments of the invention will be explained in more detail in the following with the aid of the drawing. The drawing shows in.

DESCRIPTION OF THE PREFERRED EMBODIMENTS

Figure 1:
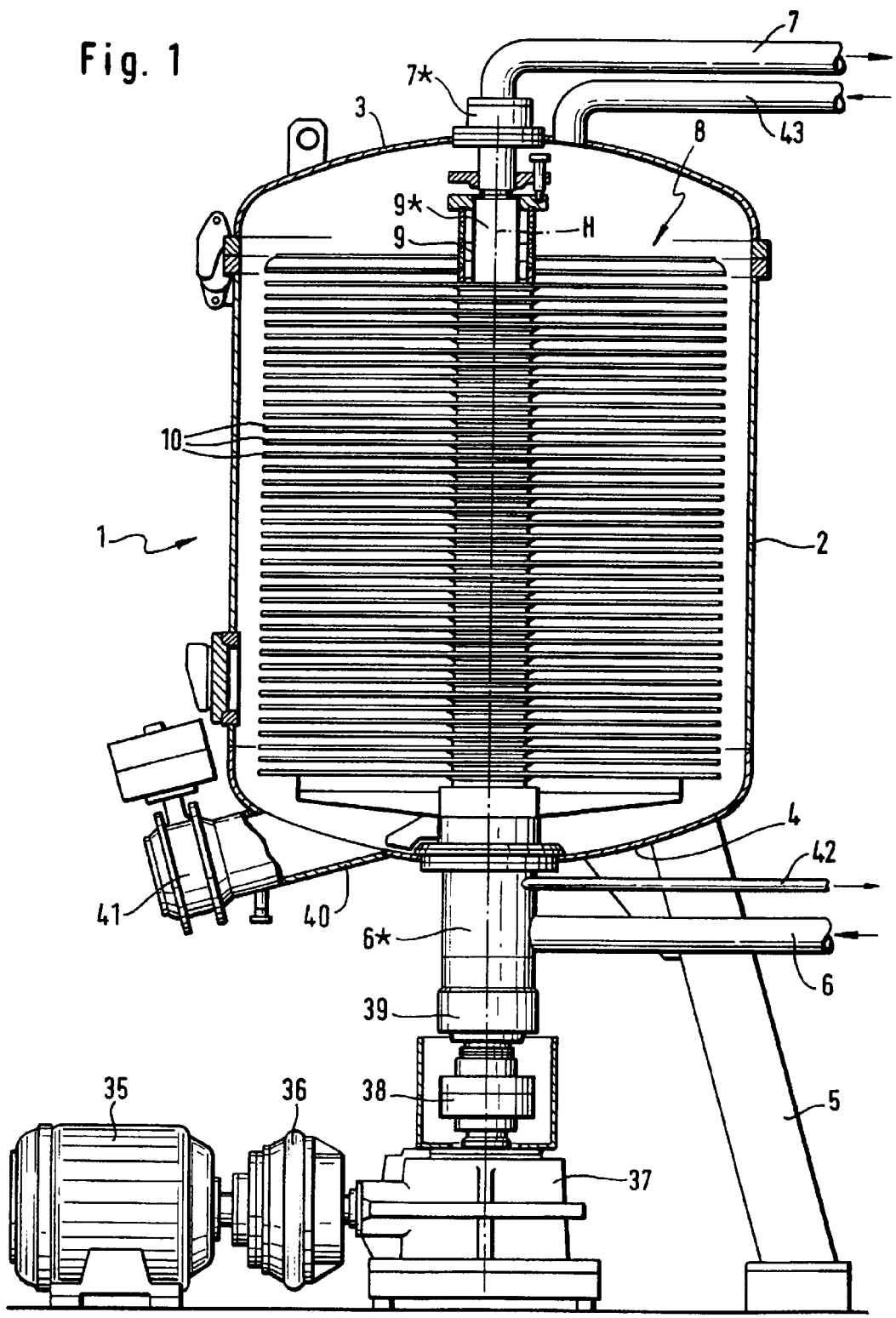
FIG. 1 a schematic representation of an axial section of a horizontal disc filter.

In FIG. 1, a horizontal disc filter 1 for filtration of liquids such as juice, wine, beer, chemical liquids etc. is represented which is designed as a centrifugal cleaning filter. It is comprised of a container 2 with a vertical axis H. The container 2 rests on legs 5 of the support and has a detachable lid 3 which can be secured on the container by means of pressure closures in a pressure tight manner. Below the container an electrical drive motor 35 is arranged, see FIG. 1, having a hydraulic clutch 36 which drives a hollow shaft 9, which penetrates the container 2 coaxially to the vertical axis H and has a central channel 9* for the filtrate in its hollow space, via an angular gear box 37 and a shaft coupling 38.

Above the shaft coupling 38 the hollow shaft 9 is supported in a bearing 39. An inlet socket 6* is centrally arranged by means of a sealing housing on the bottom 4 of the container 2, and the liquid to be filtered, the unfiltered liquid, is supplied thereto by means of an inlet pipe 6 in the direction of the arrow. As an alternative, the unfiltered liquid can be supplied via the supply channel 43 on the lid 3 of the container 2. Moreover, below the bottom 4 of the container 2 a removal pipe 42 is provided via which the residual filtrate or also the main filtrate can be removed. Furthermore, a pipe socket 40 with a shut-off valve 41 is arranged on the bottom 4 of the container 2 and extends downwardly at a slant for removal of filtrate residues and filtration aids.

A central removal socket 7* is connected to a removal pipe 7 on the lid 3 of the container 2 via which the liquid cleaned by filtration, i.e., the filtrate, is removed. The removal of the filtrate can alternatively also be carried out via the removal pipe 42. The removal socket 7* is at the same time designed as a bearing for the hollow shaft 9. In the container 2 a filter package 8 of stacked plate-shaped filter members 10 is arranged. The configuration of the filter members 10 will be explained in the following with the aid of FIGS. 2 through 8.

For the purpose of cleaning the horizontal disc filter 1 the filter cake must be removed from the filter members 10. For this purpose, the filter package 8 is rotated by means of the drive motor as well as the coupling and the gear means 36, 37, 38 so that the filter cake is removed from the filter members 10 by centrifugal force.

Figure 2:
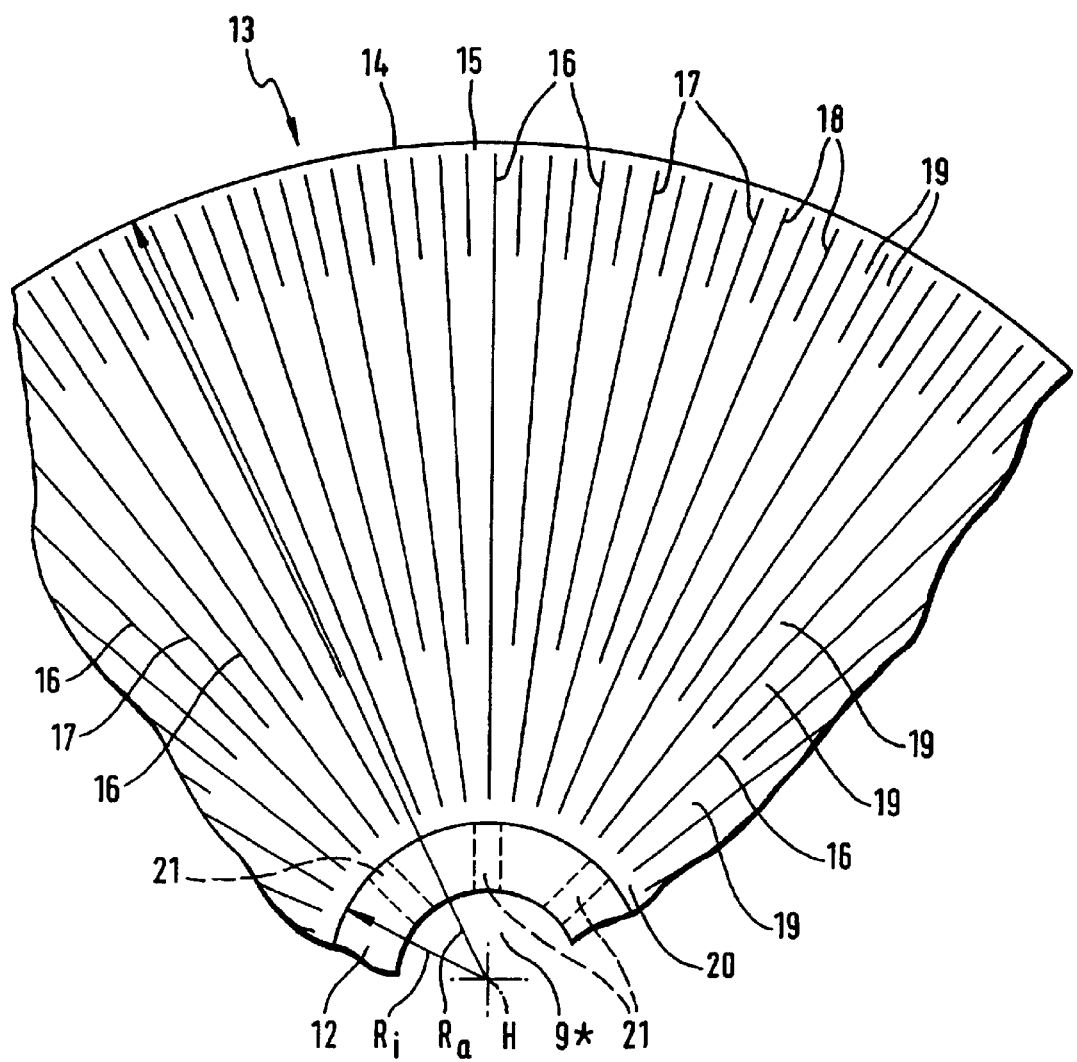
FIG. 2 a detail of a plan view onto a base plate with hub.

FIG. 2 shows in a plan view a base plate 13 which is of a circular ring shape and which is fastened with its inner radius R1 to the hub 12. The base plate 13 comprises an annular surface 15 adjacent to an outer peripheral edge 14 which surface extend along the peripheral edge 14 and from which a plurality of radially arranged projections 16, 17, 18 extend in the direction toward the hub 12. The projections 16, 17, 18 have different lengths, wherein the first projections 16 extend to a point close to the hub 12 and whose length is approximately ¾ to ⅘ of the outer radius $R_a$ of the circular ring of the base plate 13. Between two neighboring projections 16 a second projection 17 is provided whose length is approximately ¾ of the length of the first projection. A third projection 18 is positioned between a first projection 16 and a second projection 17, respectively, and, relative to the other projections, it is short and extends between the neighboring projections 16, 17 at a spacing thereto. The length of the third projection is approximately ⅙ of the length of the first projections 16.

Between the projections 16, 17, 18 cavities 19 are formed which extend from the surface 15 to a point located closely before the hub 12 and open there into a collecting chamber 20 surrounding the hub 12. The collecting chamber 20 communicates via radial openings 21 in the hub 20 with the central channel 9* illustrated in FIG. 1. In the embodiment illustrated in FIG. 2 of the base plate 13 the arrangement of the projections 16, 17, 18 is such that between two neighboring projections 16, 18 or 17, 18 an angle of 1° 52' 30" is formed. Between the first projections 16 and the second projections 17 the angle is 3° 45", respectively, and two successive first projections 16 are positioned at an angular spacing of 7° 30" relative to one another. With this division a number of 48 first projections 16 and also 48 second projections 17 results along the entire circular periphery as well as 96 third projections 18. Moreover, FIG. 2 shows that the projections 16, 17, 18, in comparison to the cavities 19, are relatively narrow and have a constant width while the width of the cavities 19 varies along its length.

Figure 3:
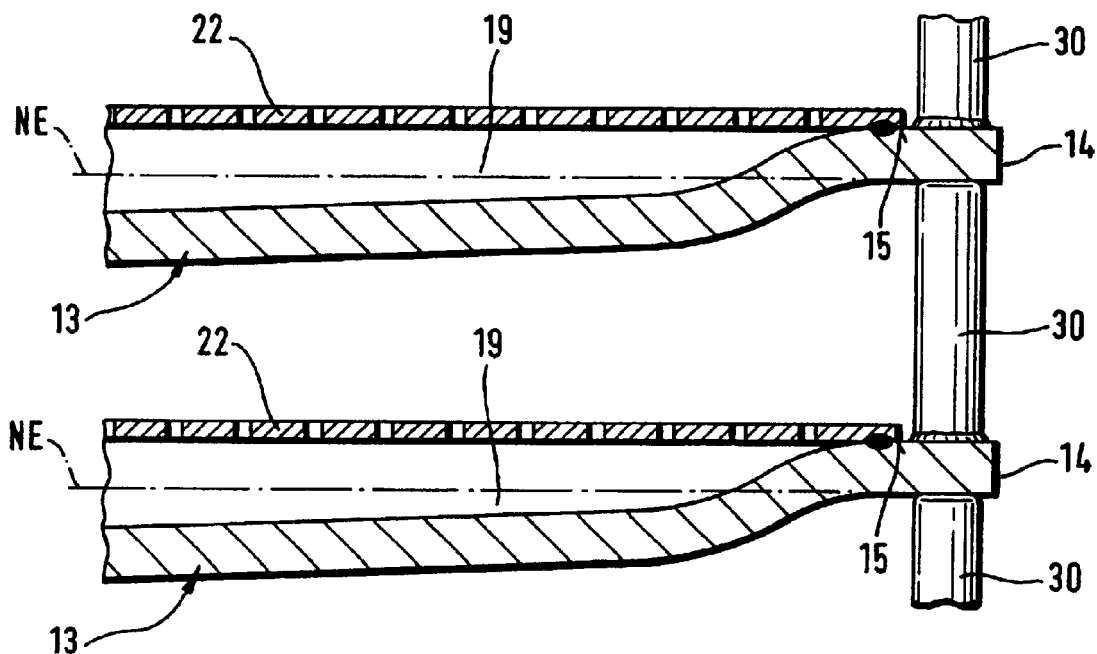
FIG. 3 an enlarged representation of a section of the edge area of two neighboring filter members.

FIG. 3 shows a section of two neighboring filter members 10 in the area of the outer peripheral edge 14. The base plate 13 is corrugated, as will be explained later on, and is deformed out of a normal plane NE in a downward direction so that, on the one hand, a plurality of projections 16, 17, 18 and cavities 19 therebetween result, as described in connection with FIG. 2, and, on the other hand, an incline toward the hub is provided. Immediately adjoining the peripheral edge 14 the surface 15 is positioned on which the outer edge of a filter plate 22 rests. The filter plate 22 comprises a plurality of openings which connect the upper side with the underside of the filter plate wherein the free opening surface area relative to the total surface area of the filter plate 22 is preferably between 0.5% and 15%. The base plate 13 and the filter plate 22 are comprised preferably of the same material, for example, stainless steel, at least, however, of a material pairing which allows in a simple manner a connection by welding.

As can be seen in FIG. 3, the filter plates 22 in the area of their support on the surface 15 are welded to the base plate 13. The filter plate 22 rests on the narrow projections extending in the direction toward the hub so that the filter plates 22 are supported and therefore do not bend toward the base plate 13. Immediately adjoining the peripheral edge 14, spacer elements 30 extending in the axial direction of the horizontal disc filter are welded onto the surface 15. They serve to precisely support the filter members 10 and maintain the predetermined spacing.

As can be seen moreover in FIG. 3, the bottom of the cavities 19 extends at a slight incline relative to the normal plane NE of the base plate 13 so that an incline toward the hub results.

Figure 4:
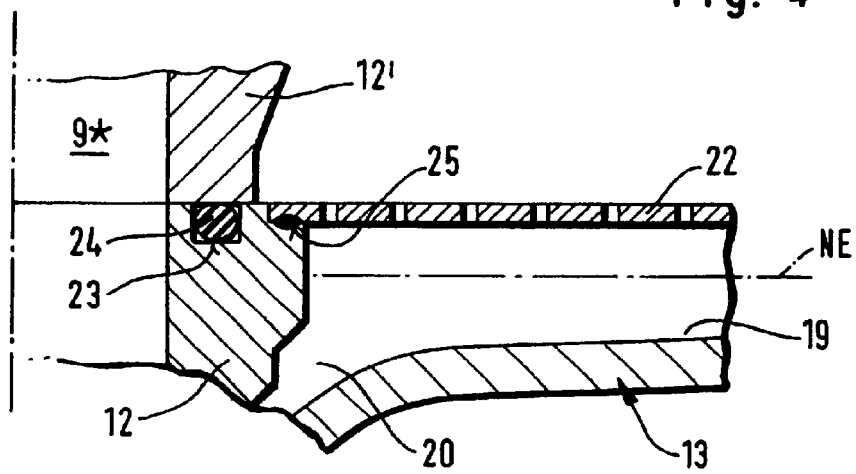
FIG. 4 a section of a filter member in the area of the hub.

FIG. 4 shows a section of the area of the filter member 10 adjacent to the hub. This illustrates that the upper side of the hub 12 has an annular groove 23 for receiving a sealing ring 24. The sealing ring 24 serves to provide a seal tight contact of the hub 12' of the filter member positioned there above.

Adjacent to the annular groove 23, a projection is provided on the upper side of the hub 12 which provides a support surface 25 for the inner end of the filter plate 22. The filter plate 22 is welded to the hub 12 via the support surface 25. Due to the slanted course of the cavities 19 in the base plate 13, the spacing of the bottom of the cavity 19 from the normal plane NE is substantially greater in the vicinity of the hub 12 than in the area of the outer periphery of the filter member 10 that is illustrated in FIG. 3. In front of the hub 12 the base plate 13 is drawn downwardly so that the collecting chamber 20 is formed between the hub 12 and the base plate 13. All cavities 19 open into this chamber. Since the filter plate 22 is welded to the support surface 25 of the hub 12, a tight connection results so that additional sealing means between the filter plate 22 and the hub 12 are not required.

Figure 5:
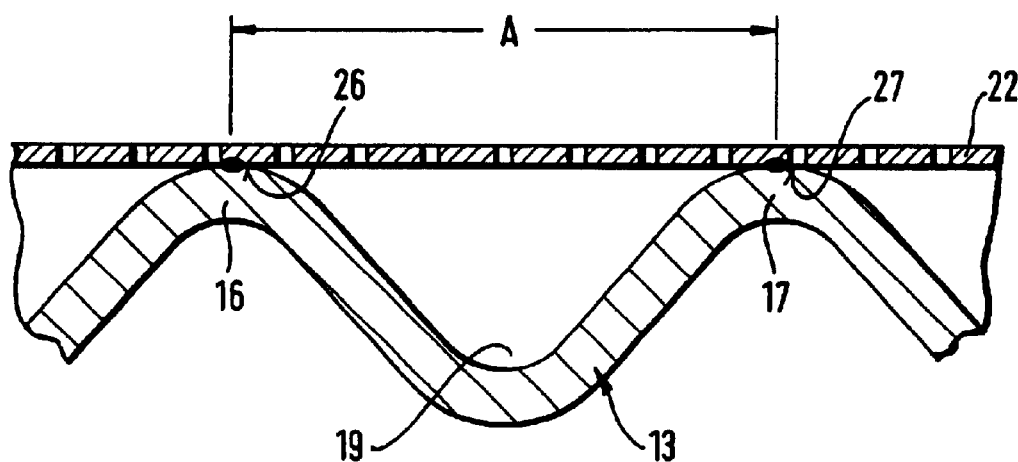
FIG. 5 a section of a filter member transverse to the radial direction.

The sectional representation of FIG. 5 shows that the base plate is a stamped or deepdrawn part in which the cavities 19 are formed as beads, i.e., the base plate 13 has corrugations so that the cavities 19 and the projection 16, 17 alternate, respectively. The course of these corrugations in the base plate 13 can be taken from the already described FIG. 2. The filter plate 22 rests linearly on the surfaces 26, 27 formed by the domes of the projections 16 and 17 and is connected at least partially thereto by welding. The maximum spacing A of the projections 16, 17 from one another depends inter alia on the bending stiffness of the filter plate 22 and the forces acting on the filter plate. In order to achieve a good dimensional stiffness of the entire filter member 10 and to ensure, in spite of this, sufficiently wide cavities for the outflow of the filtrate, a spacing of the support surfaces 26, 27 from one another of a magnitude of maximally 50 mm, preferably 15 mm, is expedient. The support surface of the filter plate 22 on the projections 16, 17 is designed to be as small as possible by means of the domes so that the determined free filter surface is not affected by a closure of many through openings. As can be seen in FIG. 5, the beads formed by the cavities 19 and the projection 16, 17 have essentially a V-shape.

Figure 6:
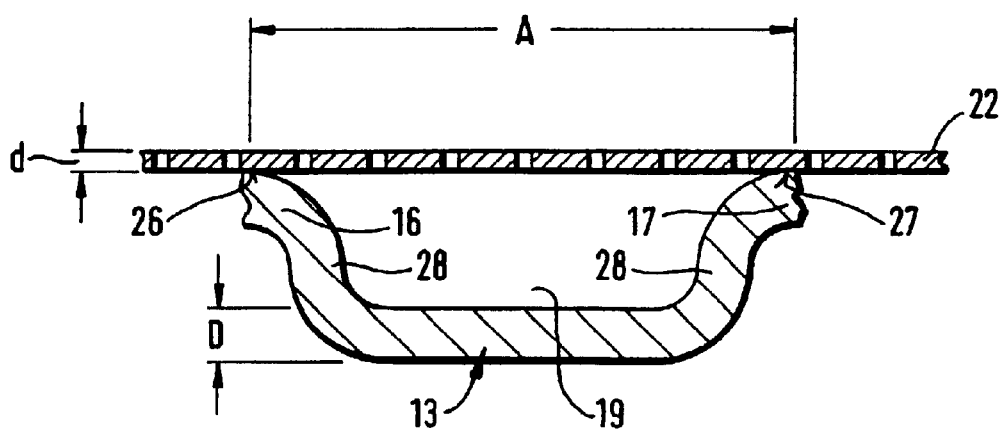
FIG. 6 a variant of the embodiment of FIG. 5.

One embodiment of the bead shape is illustrated in FIG. 6. In this connection, the base plate is formed such that the cavities 19 are delimited by the wall portions 28 of the projections 16, 17 which extend steeply upwardly, i.e. toward the filter plate 22. In this way, a U-shaped cross-section of the bead results. The spacing of the support surfaces, which are formed by the projections 16, 17, is indicated in FIG. 6 by A and is, for example, approximately 15 mm. The thickness d of the filter plate is, for example, 0.4 mm while the base plate 13 has a thickness d of approximately 1.5 mm.

Figure 7:
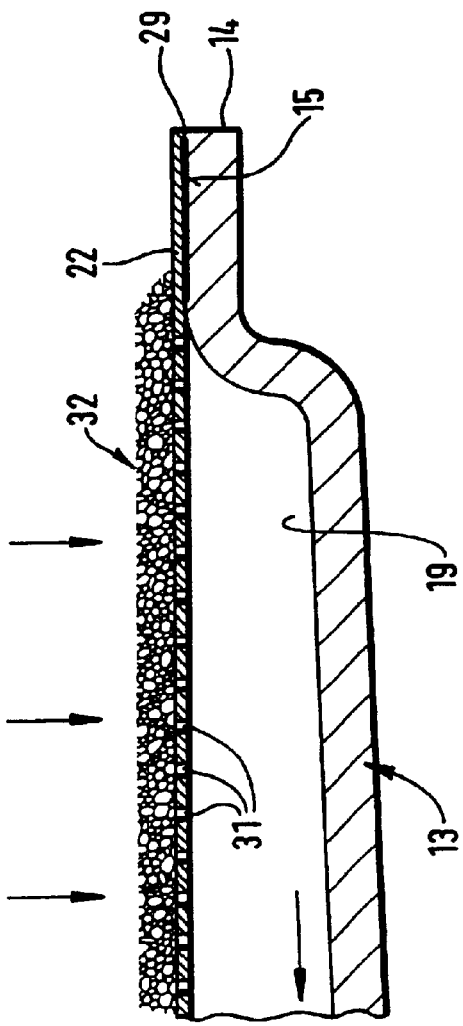
FIG. 7 a radial section in the area of the outer peripheral edge of a filter member with deposited layer.

While in FIG. 3 a gradual transition of the surface 15 in the edge area of the base plate 13 toward the cavities 19 is provided, FIG. 7 shows that also a more distinct shaping in this edge area is possible so that cavities 19 with a large cross-section are available already in the radially outer area. Moreover, FIG. 7 shows that the filter plate 22 can be fixedly connected to the base plate 13 by means of a welding seam on the surface 15, which seam extends radially relative to the shape of the base plate 3. The filter plate 22 is provided with a plurality of openings 31 through which the liquid passes as indicated by the directional arrows. A deposit layer 32 comprised of filtration aids is positioned on the filter plate 22, which serves as a deposit support.

Figure 8:
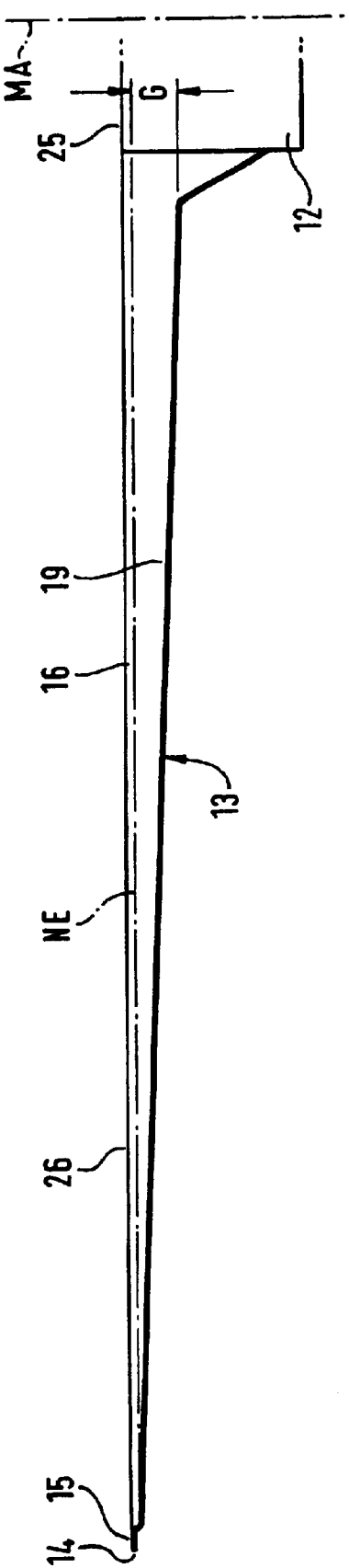
FIG. 8 a schematic representation of a radial section of a base plate.

FIG. 8 shows schematically a radial section of the base plate 13 and the hub 12 which shows that the inner peripheral edge of the base plate 13 is fixedly connected to the hub 12 and is preferably welded thereto. The central axis of the filter member is identified by MA. In order for the filtrate to be able to flow out easily, the slant of the cavities 19 in the direction toward the hub 12 should be sufficiently large, wherein it is especially preferred to have a slanted course of an angle of 2° relative to a horizontal plane defined by the normal plane NE. The thus resulting incline is indicated in FIG. 8 by G. As can be taken from FIG. 8, the surface 15, which extends along the outer peripheral edge 14, as well as the support surface 26 and the support surface 25 formed on the hub 12 are positioned in a common plane so that the filter plate is supported well on all connecting surfaces without having to be especially adapted. A welding of the filter plate 22 to the base plate 13 on the aforementioned surfaces is possible in the form of a welding seam or by spot welding.

What is claimed is:

1. A filter member for horizontal disc filters (1), said filter member comprising:
   a base plate (13) having a peripheral edge (14);
   a hub (12) connected to said base plate (13);
   said base plate (13) having cavities (19) extending in a radial direction of said base plate (13) at a slant (G) toward said hub (12), wherein said cavities (19) are positioned adjacent to one another;
   said base plate (13) having projections (16, 17, 18) formed between said cavities (19);
   a filter medium configured to form a support for deposition filtration and cake-forming filtration;
   wherein said filter medium is formed as a filter plate (22) with openings (31);
   wherein said hub (12), said projections (16, 17, 18) between said cavities (19), and said peripheral edge (14) have support surfaces (15, 25, 26, 27) configured to support said filter plate (22);
   wherein said filter plate (22) is connected at least to portions of said support surfaces (15, 25, 26, 27) by material bonding.

2. The filter member according to claim 1, wherein said filter plate (22) is welded to said support surfaces (15, 26, 27) of said peripheral edge (14), of said projections (16, 17, 18), and of said hub (12).

3. The filter member according to claim 1, wherein said filter plate (22) and said base plate (13) are comprised of stainless steel.

4. The filter member according to claim 3, wherein said filter plate (22) and said base plate (13) are comprised of stainless steel alloys.

5. The filter member according to claim 3, wherein said base plate (13) is a stamped or deepdrawn part and said cavities (19) are beads.

6. The filter member according to claim 1, wherein at least one of said filter plate (22) and said base plate (13) is comprised of plastic material.

7. The filter member according to claim 6, wherein said plastic material is selected from the group consisting of PVC, PE, PP, and PVDF.

8. The filter member according to claim 1, wherein said filter plate (22) has a thickness (d) of less than 6 mm.

9. The filter member according to claim 8, wherein said thickness (d) is approximately 1.5 mm.

10. The filter member according to claim 1, wherein said projections (16, 17, 18) have a cross-section with an arc-shaped dome, wherein said support surfaces (26, 27) of said projections (16, 17, 18) are formed by said arc-shaped domes and are linear.

11. The filter member according to claim 10, wherein said projections (16, 17, 18) have substantially a constant width and wherein said cavities (19) have a varying width.

12. The filter member according to claim 1, wherein a spacing (A) between two of said projections (16, 17) is maximally approximately 50 mm.

13. The filter member according to claim 1, wherein said cavities (19) are beads and have a U-shaped or V-shaped cross-section.

14. The filter member according to claim 1, wherein said cavities (19) have an incline toward said hub (12) of at least 0.5° relative to a horizontal axis (NE).

15. The filter member according to claim 14, wherein said incline is approximately 2°.

16. The filter member according to claim 1, wherein said support surface of said peripheral edge (14) is a flange surface (15) positioned in a same plane as said support surface (25) of said hub (12) and upper edges of said projections (16, 17, 18) forming said support surfaces of said projections (16, 17, 18).

17. The filter member according to claim 1, wherein said projections comprise first projections and second projections (16, 17), wherein said first projections (16) have a length different from a length of said second projections (17), wherein said first and second projections (16, 17) are distributed in an alternating fashion in a circumferential direction of said base plate (13).

18. The filter member according to claim 17, wherein said base plate (13) in a plan view has a shape of a circular ring, wherein an inner radius ($R_i$) of said circular ring is determined by said hub (12) and wherein said first and second projections (16, 17) start close to said peripheral edge (14), wherein said length of said first projections (16) is preferably approximately ¾ to ⅘ of an outer radius ($R_a$) of said circular ring and said length of said second projections (17) is preferably approximately ¾ of said length of said first projections (16).

19. The filter member according to claim 18, wherein said cavities (19) and said projections (16, 17) are arranged in uniform distribution in said circumferential direction.

20. The filter member according to claim 17, wherein said projections comprise third projections (18) having a substantially shorter length than said first and second projections (16, 17) and positioned between said first and second projections (16, 17) at a spacing thereto, respectively.

21. The filter member according to claim 20, wherein said length of said third projections (18) is approximately ⅙ of said length of said first projections (16).

22. The filter member according to claim 1, comprising several spacer elements (30) connected to said base plate (13) and extending in an axial direction away from said base plate (13), said spacer elements (30) arranged uniformly about a circular periphery on said peripheral edge (14).

* * * * *